Dec. 21, 1926.
F. W. SICKLES ET AL
1,611,686
RADIO INDUCTANCE DEVICE
Filed Nov. 15, 1923      2 Sheets-Sheet 1
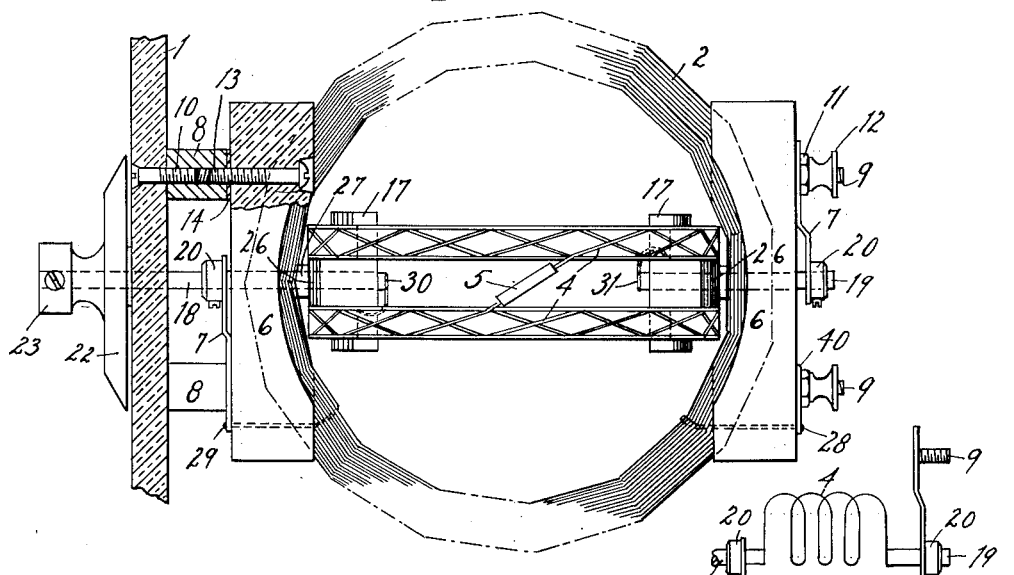
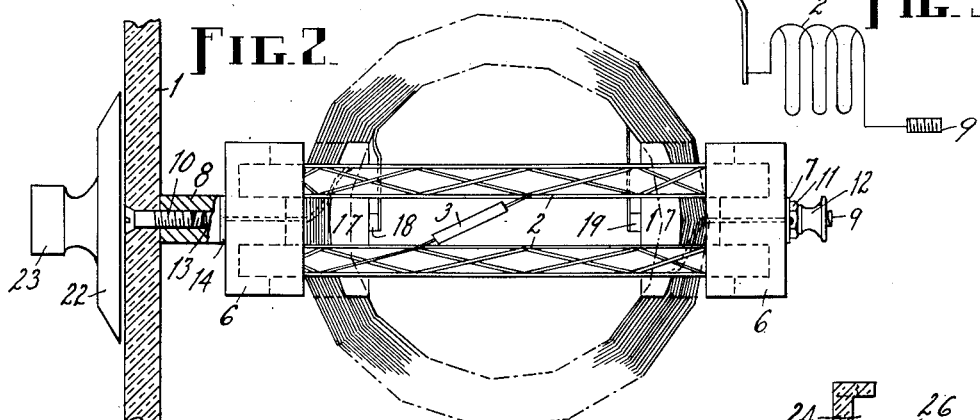
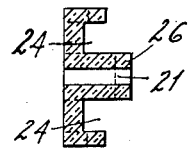
Frank W. Sickles, Royal F. Sickles, INVENTORS.
BY
Frank A. Cutter, ATTORNEY.

Dec. 21, 1926.
F. W. SICKLES ET AL
1,611,686
RADIO INDUCTANCE DEVICE
Filed Nov. 15, 1923
2 Sheets-Sheet 2
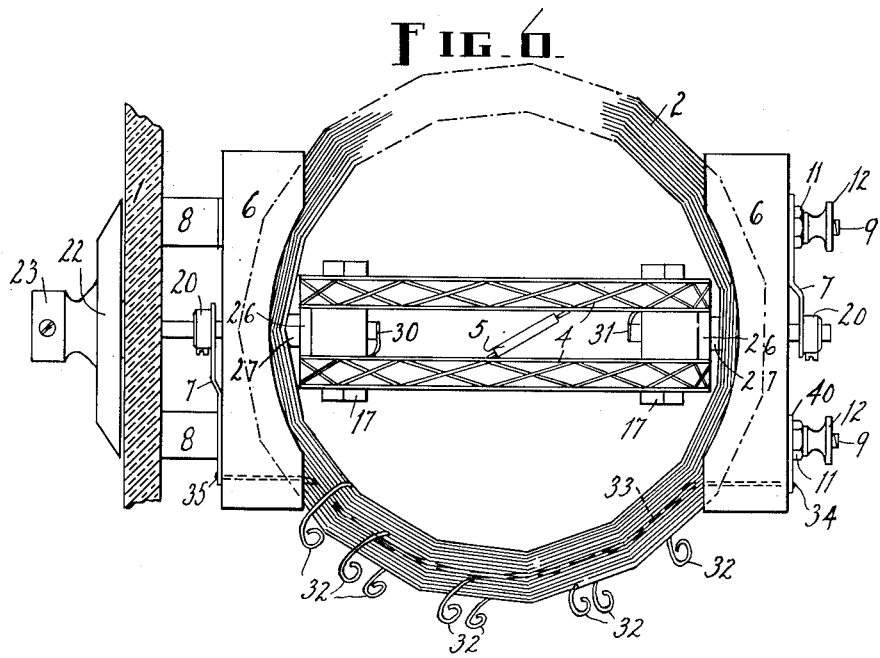
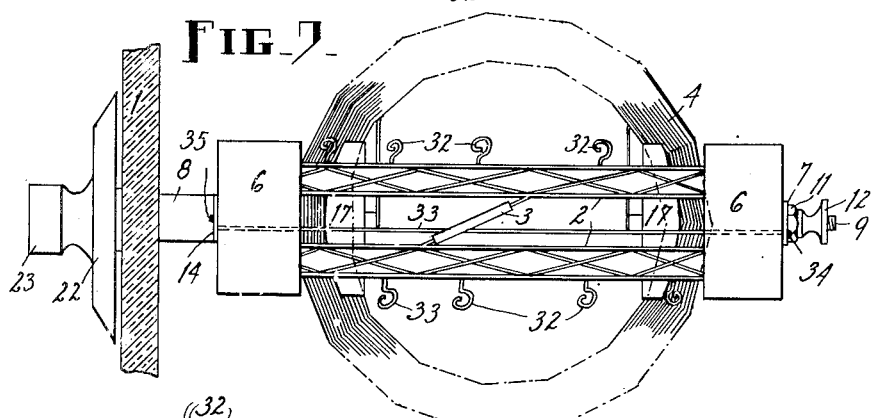
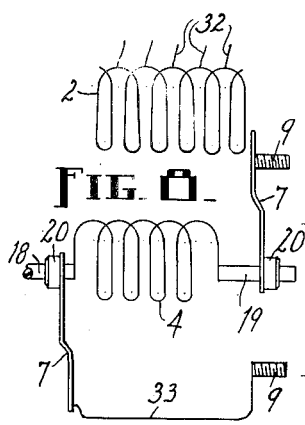
Frank W. Sickles, Royal F. Sickles INVENTORS.
BY
Frank A. Cutter, ATTORNEY.

Patented Dec. 21, 1926.

1,611,686

UNITED STATES PATENT OFFICE.

FRANK W. SICKLES AND ROYAL F. SICKLES, OF SPRINGFIELD, MASSACHUSETTS, ASSIGNORS TO THE F. W. SICKLES COMPANY, OF SPRINGFIELD, MASSACHUSETTS, A CORPORATION OF MASSACHUSETTS.

RADIO INDUCTANCE DEVICE.

Application filed November 15, 1923. Serial No. 674,938.

Our invention relates to inductance devices or instruments, such as variometers and variocouplers, used in the radio art, and consists of a stationary or stator inductance cemented or otherwise firmly secured to oppositely-disposed, supporting, dielectric or insulating members, said members having openings therethrough the axes of which are in line with each other, terminal members or binding-posts on one of said insulating members, and means on the other of said insulating members for mounting or attaching the complete device to some stationary object, such as the panel of a radio-receiving set, a conducting member connected with one of said binding-posts, a conducting member connected with one of the mounting or attaching members or instrument supports, a revolving or rotor inductance cemented or otherwise firmly secured to two other oppositely-disposed, supporting dielectric or insulating members, the rotor inductance and insulating members being inside of the stator inductance and insulating members, and shafts or spindles passing through and secured to said last-named insulating members, and through said openings in said first-named insulating members, in which latter said spindles may be rotated, together with such other parts and members as may be necessary or desirable in order to render the instrument complete and serviceable in every respect, all as hereinafter set forth.

The inductance for either or both the stator and rotor comprises one or more coils, usually two in each case, and for such inductance we prefer to use coils of the type set out in the application for Letters Patent of the United States, Serial Number 628,268, filed by Royal F. Sickles, although a different type might be substituted therefor.

When the two elements, namely, the stator and the rotor, are assembled, the rotor shafts or spindles pass through the insulating members supporting the stator inductance, and the rotor is capable of being revolved inside of the stator without touching the same.

The electrical connections of the device vary according to whether the device be of the variometer or the variocoupler type. In the case of the variometer, the wire in the rotor inductance is wound in the same direction, and the inductance coils are connected in series so that they aid each other. What may be termed the beginning of the rotor inductance is connected to one of the aforesaid spindles, and what may be termed the ending of said inductance is connected to the other of said spindles. Each spindle has an electric contact with one of the aforesaid conducting members, the latter being connected either with one of the binding-posts or one of the instrument supports. The terminal of the rotor that is connected with the front spindle has an electrical connection through said spindle and one of the connecting members with one end of the wire of the stator inductance, the coils of which latter are also connected in series, and the other end of said wire is connected with one of the binding-posts on the opposite or back side of the variometer. Thus the total winding of the rotor inductance is in series with the total winding of the stator inductance, and the beginning of the rotor inductance and the ending of the stator inductance terminate in the binding-posts.

The general construction of the variocoupler is similar to that of the variometer, but in the case of the former the two extreme terminals of the rotor inductance are in the binding-posts, and, although the stator inductance coils are connected in series as before mentioned, they are tapped at intervals throughout their total winding, the taps terminating in suitable means for connecting the instrument in the circuit. Furthermore, the rotor inductance is not electrically connected with the stator inductance, but affects the latter through induction.

Although our invention is especially well adapted for embodiment in variometers and variocouplers, it may be embodied in other devices or instruments of a more or less similar character.

In our construction the winding is such that electrical tap connections can be taken off at any point without interfering with the instrument.

One object of our invention is to produce a radio-inductance device from which are eliminated all kinds of electrical losses, or, in any event, in which such losses are reduced to the minimum, and to obtain the desired inductive action. These results are largely due to the fact that each separate winding is spaced at a reasonable distance from the next winding, a condition that tends very greatly to reduce or eliminate altogether electrical losses, and to the further fact that the coils are so mounted on or in relation to insulation that only comparatively small areas of said coils come into contact with said insulation, the other portions of the coils being supported in midair. The insulation should be of the highest grade and best quality, and, if cement be used to secure together the insulating members and coils, such cement must be composed of an insulating substance or substances.

A further object is to construct a device, of the character described wherein insulating members serve in a considerable number of different and important capacities: Said members hold in alignment the diametral axes of the coils, hence are aligners; said members are supporting elements, inasmuch as they support the instrument in position, when one of the members is secured to a panel or other object, it being adapted to be so secured; they are equipped with terminal connections, and with connecting members for taking the current from rotating spindles that form parts of the rotor, and therefore are important elements in the formation of the electric circuit through the instrument; they provide bearings for the rotor spindles; they constitute abutments which are well adapted to take the thrust of the rotor, and properly center the same; they are spacers as well as insulators; and, as previously stated or intimated, said insulating members furnish a support for the coils of such a nature that the exterior wire, in any case, bears for a short distance only on the contiguous insulating member.

Other objects and advantages will appear in the course of the following description.

We attain the objects and secure the advantages of our invention by means such as those illustrated in the accompanying drawings, in which—

Figure 1 is a top plan of a variometer embodying a practical form of our invention, with parts broken away; Fig. 2, a side elevation of said variometer, with parts broken away; Fig. 3, a diagrammatical view of the variometer showing the course of the current; Fig. 4, a cross section through one of the insulating members of the stator; Fig. 5, a cross section through one of the insulating members for the rotor; Fig. 6, a top plan of a variocoupler which embodies our invention; Fig. 7, a side elevation of said variocoupler, and, Fig. 8, a diagrammatical view of the variocoupler showing the course of the current.

Similar reference characters designate similar parts throughout the several views.

In the general views fragmentary portions of panels of insulating material to which the devices are attached are represented at 1.

The variometer comprises a fixed or non-rotary element or stator, and a rotary element or rotor positioned within said stator. Both of these elements have a common diametral axis.

In the present example of the variometer, the stator inductance comprises coils 2 arranged side by side in spaced relationship and connected at 3, and the rotor inductance comprises two similarly arranged coils 4 connected at 5. All of these inductance coils may be of any suitable type, but we prefer to use the type of which mention has hereinbefore been made.

In addition to the coils 2, the variometer stator consists of a pair of dielectric or insulating members, such as blocks 6, a pair of connecting members, such as resilient or spring contacts 7, a pair of supporting posts 8, a pair of terminals or binding-posts 9, a screw 10 tapped into each of said supporting posts, and a set-nut 11 and a thumb-nut 12 for each of said binding-posts. The supporting posts 8 are attached to the front of the forward block 6, and the binding-posts 9 project from the back of the rear block 6. Each post 8 is secured to its block 6 by means of a screw 13 which passes through said block from the inside and is tapped into said post. A washer or spacer 14 is mounted on the screw 13 that secures one of the posts 8 to its block 6, and interposed between such post and block, and one of the contacts 7 is mounted on the other screw 13, and interposed between the other of said posts and said block. The other contact 7 is mounted on one of the binding-posts 9 between the set-nut and the block 6 which carries said binding-posts. The contacts 7 are so located that one extends in one direction past the transverse center of its block 6, and the other extends in the opposite direction past the transverse center of its block 6. On the other binding-posts 9 is a contact strip 40 which is clamped in place between the block 6 and the set-nut 11 on said binding-posts.

Each screw 10 passes through the panel 1, from the front side thereof, into one of the posts 8 behind. When the screws 10 are tightened the posts 8 are drawn firmly against the inside face of the panel 1, and in this manner and by this means the device is rigidly attached to said panel. The heads of the screws 10 are countersunk in the panel. The screws 10 and 13 enter the posts 8 at the front and rear ends, respectively, of said posts, and the screws in each post are in alignment with each other.

The instrument may be arranged at right-angles to the position which it occupies in the drawings, when the posts 8 are located one above the other instead of side by side, it being immaterial whether the stator lie horizontally or stand vertically.

Each block 6 on the inner side is concave to conform to the curvature of the coils 2, and preferably such block has therein grooves 15—15 to receive contiguous portions of said coils, such grooves opening through said inner side. The length of the block 6 and the depth of the grooves 15 therein are sufficient to afford the necessary amount of support for the coils 2, while at the same time presenting a comparatively small area for contact with said coils. The blocks and coils are usually cemented together, and, in any event, the connections between these members are sufficiently rigid and stable. Extending through the transverse center of each block 6 from front to back is a passage 16.

In addition to the coils 4, the rotor of the variometer comprises a pair of dielectric or insulating members, such as blocks 17, shafts or spindles 18 and 19, and a collar 20 on each of said spindles. A passage 21 extends through each block 17 in the transverse center thereof from front to back for one of the spindles. The blocks 17 are rigidly secured to the spindles 18 and 19, and said spindles extend beyond both the front and back sides of said blocks. The spindle 18 extends forwardly from the front block 17 through the passage 16 in the front block 6, and through the panel 1, to receive outside of said panel a dial 22 and knob 23, said dial and knob being integral, rigidly secured to said spindle, and of usual construction. The spindle 19 extends rearwardly from the back block 17 through and beyond the back block 6. The spindle 18 passes through the free terminal portion of the forward spring contact 7, and one of the collars 20 is secured to said spindle in such position that said contact bears against the same. The spindle 19 extends through the free terminal portion of the rear spring contact 7, and the other collar 20 is secured to said spindle in such position that said contact bears against the same. Preferably the collars 20 are adjustable on their spindles, in order that a good contact between the members 7 and said collars may be insured at all times.

Each block 17 has in its outer side a pair of grooves 24 to receive therein contiguous portions of the collars 4. Here, again, the necessary amount of surface engagement between the blocks and the coils is provided to insure rigidity and stability, while at the same time is avoided excess in area for contactual relationship.

The blocks 6 receive in their grooves 15 portions of the outer peripheries of the coils 2, while the blocks 17 receive in their grooves 24 portions of the inner peripheries of the coils 4. The blocks 6 and 17 are all arranged with the central passages thereto in line with each other, the spindles 18 and 19 are free to revolve in said blocks 6, and the outer diameter of the coils 4 is slightly less than the inner diameter of the coils 2 so that the former can be rotated inside of the latter.

The partition (25) between the grooves 15 in each block 6 is wider than the outer sides of said grooves, and the partition (26) between the grooves 24 in each block 17 is also wider than the outer sides of said last-named grooves. The adjacent blocks 6 and 17, either those in front or those behind, are arranged with the grooves in one opening toward the grooves in the other, and between the adjacent edges or sides of the partitions 25 and 26 of said blocks is a spacer 27 mounted on the spindle 18, or the spindle 19, as the case may be. Thus provision is made for centering the coils 4 within the coils 2 and enabling the former to be rotated within the latter. The arrangement is such that, when the larger and smaller coils are parallel, they are separated from each other by the same amount of clearance at all points. The spacers 27 prevent the spindles 18 and 19 from moving endwise in the bearings therefor provided by the blocks 6.

One terminal of the connected stator coils 2, after passing through the rear block 6, is connected at 28 with the contact strip 40, and the other terminal of said connected coils, after passing through the front block 6, is connected at 29 with the spring contact 7 that is carried by said last-named block. Opposite terminals of the connected rotor coils 4 are connected respectively at 30 and 31 with the inner terminals of the spindles 18 and 19. It will be seen, therefore, that the circuit between the binding-posts 19, with which posts wires (not shown) from and to the source of energy are connected, is from one binding-post 19, through the contact strip 40, the stator coils 2, the front spring contact 7, the collar 20 against which said contact bears, the spindle 18, the rotor coils 4, the spindle 19, the collar 20 on said last-named spindle, and the rear contact spring 7, to the other binding-post 9.

The mechanical operation of this variometer differs in no important particular from that of a variometer of some other construction.

The variocoupler comprises a stator and rotor and other elements and parts and members which are practically identical with those that enter into the construction of the variometer and have already been described in detail. The connections are different, however, and the stator coils 2 in the variocoupler are provided with a plurality of taps 32. These stator coils, moreover, have no mechanical connection with the rotor coils, but there is the relation through induction. An independent wire 33 has one terminal connected at 34 with the contact strip 40, and the other terminal connected at 35 with the front spring contact 7. The terminals of the rotor coils 4 are connected at 30 and 31, respectively, with the spindles 18 and 19, precisely in the same manner in this as in the other case.

It is now seen that the circuit between the binding-posts 9 is established through the rotor coils 4 without passing through the stator coils 2, such circuit being from one of said binding-posts, through the contact strip 40, the wire 33, the front spring contact 7, the collar 20 against which said contact bears, the spindle 18 upon which said collar is mounted, the rotor coils 4, the spindle 19, the collar 20 on said last-named spindle, and the rear spring contact 7, to the other of said binding-posts.

As with the variometer, so with the variocoupler, the mechanical operation of the latter differs in no important respect from that of variocouplers of other makes.

More or less change in the shape, size, construction, and arrangement of some or all of the parts of our radio inductance device, and in the connections between the coils thereof and the insulating blocks with their appurtenances, in addition to those hereinbefore specifically pointed out, may be made without departing from the spirit of our invention, or exceeding the scope of what is claimed.

What we claim as our invention, and desire to secure by Letters Patent, is—

1. A radio inductance device comprising stator inductance, oppositely-disposed insulating blocks attached to said inductance, contact members carried by said blocks and terminals carried by one of said blocks, said contact members at their free ends extending away from said blocks, rotor inductance, oppositely-disposed insulating blocks attached to said rotor inductance, and provided with spindles which are mounted, in spaced relationship endwise, in said first-named blocks, collars on said spindles outside of and beyond said first-named blocks and with which said free ends of said contact members engage, and the connections necessary to complete the circuit from one of said terminals to the other through said contact members and said spindles.

2. A radio inductance device comprising stator inductance, oppositely-disposed insulating blocks attached to said inductance, contact members carried by said blocks and terminals carried by one of said blocks, rotor inductance, oppositely-disposed insulating blocks attached to said rotor inductance, and provided with spindles which are mounted, in spaced relationship endwise, in said first-named blocks, collars mounted on said spindles outside of and beyond said first-named blocks, said contact members having their free ends located between said first-named blocks and said collars and in engagement with the latter, and said collars being adjustable on said spindles whereby to vary the amount of frictional engagement between the contact members and collars, and the connections necessary to complete the circuit from one of said terminals to the other through said contact members and said spindles.

3. A radio inductance device comprising stator inductance, oppositely-disposed insulating blocks attached to said coils, said blocks having therein concave grooves to receive contiguous portions of said inductance, a connecting member carried by each of said blocks and terminals carried by one of said blocks, rotor inductance, oppositely-disposed insulating members attached to said rotor inductance, and provided with spindles which are journaled in said blocks between said grooves therein, said spindles being in contact with said connecting members, and the connections necessary to complete the circuit from one of said terminals to the other through said connecting members and spindles.

4. A radio inductance device comprising stator inductance, oppositely-disposed insulating members attached to said inductance, connecting members carried by said insulating members and terminals carried by one of said insulating members, rotor inductance, oppositely-disposed insulating blocks attached to said rotor inductance, said blocks having therein convex grooves to receive contiguous portions of said last-named inductance, and provided with spindles which are mounted in said insulating members, said spindles being in contact with said connecting members, and the connections necessary to complete the circuit from one of said terminals to the other through said connecting members and spindles.

5. A radio inductance device comprising stator inductance, oppositely-disposed insulating blocks attached to said coils, said blocks having therein concave grooves to receive contiguous portions of said inductance, connecting members carried by said blocks and terminals carried by one of said blocks, rotor inductance, oppositely-disposed insulating blocks attached to said rotor inductance, said last-named blocks having therein convex grooves to receive contiguous portions of said last-named inductance, and provided with spindles which are journaled in said first-named blocks between the grooves therein, said spindles being in contact with said connecting members, and the connections necessary to complete the circuit from one of said terminals to the other through said connecting members and spindles.

6. In a radio inductance device, stator inductance and oppositely-disposed insulating members therefor, rotor inductance and oppositely-disposed insulating members therefor, said last-named insulating members being provided with spindles journaled in said first-named insulating members, said spindles being spaced apart endwise, the necessary circuit-forming members, and means to attach and support said parts and members when assembled to and from a single panel, with said spindles in a horizontal position, such attaching means being applied to one of said stator-inductance insulating members, and said parts and members on the side opposite to said last-named insulating member being without direct support.

7. In a radio inductance device a stator inductance, oppositely-disposed insulating blocks attached to said inductance, posts axially bored and threaded, a screw passing through one of said blocks into each of said posts at one end, and a screw adapted to be passed through a support, such as a panel, into each of said posts at the other end, whereby said stator inductance is secured to said support, but maintained at a distance therefrom.

FRANK W. SICKLES.
ROYAL F. SICKLES.